United States Patent
Hsu

(10) Patent No.: US 8,763,974 B2
(45) Date of Patent: Jul. 1, 2014

(54) SUPPORT STRUCTURE

(75) Inventor: Yu-Tsun Hsu, New Taipei (TW)

(73) Assignee: Jarllytec Co., Ltd., New Taipei (TW)

( * ) Notice: Subject to any disclaimer, the term of this patent is extended or adjusted under 35 U.S.C. 154(b) by 270 days.

(21) Appl. No.: 13/411,169

(22) Filed: Mar. 2, 2012

(65) Prior Publication Data
US 2012/0273448 A1     Nov. 1, 2012

(30) Foreign Application Priority Data

Apr. 28, 2011   (TW) .............................. 100114788 A

(51) Int. Cl.
*A47G 29/00*         (2006.01)
(52) U.S. Cl.
USPC ......... 248/371; 248/372.1; 248/393; 248/395
(58) Field of Classification Search
CPC .............. F16M 11/10; F16M 11/2021; F16M 2200/044
USPC .............. 248/917–923, 394, 395, 397, 188.1, 248/393
See application file for complete search history.

(56) References Cited

U.S. PATENT DOCUMENTS

2009/0072112 A1*  3/2009  Lee et al. ...................... 248/371
2013/0299663 A1*  11/2013  Pan et al. ...................... 248/371

* cited by examiner

*Primary Examiner* — Amy J. Sterling

(74) *Attorney, Agent, or Firm* — Guice Patents PLLC

(57) ABSTRACT

The present invention relates to a support structure, which comprises a connection unit, a base, at least a base hinge, at least a main hinge and at least an auxiliary connection member. Through folding the connection unit towards the base, an upper end of the auxiliary connection member links an upper shaft ring pivoted with the main hinge to rotate, and further drives a moveable shaft rod and a stop member of the main hinge to rotate, thereby gradually altering the stopping location, and the object to be supported is enabled to be horizontally folded; as such, the object to be supported can be maintain in a stable state during the folding process, thereby preventing the occurrence of falling.

12 Claims, 7 Drawing Sheets

SUPPORT STRUCTURE

BACKGROUND OF THE INVENTION

1. Field of the Invention

The present invention relates to a support structure, especially to a support structure with a foldable function.

2. Description of Related Art

A conventional flat monitor, such as a liquid crystal monitor, liquid crystal television or plasma television, has advantages of light in weight, thin in thickness and having no radiation, thereby being used to replace the CRT monitor which is heavy in weight and large in volume. As such a support structure is a must-have accessory for the flat monitor. However, the flat monitor has a limitation of viewing angle, so at least a hinge structure is installed between the monitor and a base, thereby enabling the elevation angle of the flat monitor to be adjusted relative to the base.

However, the base is not equipped with functions of lifting or forwardly/backwardly moving the flat monitor. The skilled people in the art have developed an auxiliary connection member which is installed in parallel, e.g. end parts of two connection rods being respectively connected to a main hinge at the upper end of a connection unit and a base hinge at the lower end. Take the China Patent No. 1244852C (corresponding to the U.S. Pat. No. 6,822,857), issue on the 8 Mar., 2006, titled in "Monitor improved in a tilting structure" for example; according to FIG. 5 disclosed in the patent, the components numbered as 100 and 110 are a pair of auxiliary connection members arranged in parallel, wherein a pair of auxiliary connection members at one lateral side of a connection unit, a main hinge and a base hinge jointly form a parallel four-bar linkage mechanism, such that the auxiliary connection members are enabled to convert the rotation motion of the connection unit relative to the base unit into the inclined motion of a monitor main body. In other words, when the height of the monitor main body is desired to be adjusted, and the connection unit inclines the monitor main body along the up/down direction, only the second and the third friction springs (sleeves) connected with the main rack would rotate around the third and the fourth hinges, thereby maintaining the original angle of the monitor main body during the displacement.

For a flat monitor manufacturer to reduce the volume during transportation, before the object to be supported, the connection unit and the base are packed, the above three have to be in a folding state for lowering the height to the minimum. Generally, a rotary state is formed between the connection unit and the main hinge of a conventional support structure, if the object to be supported, e.g. a flat monitor, is placed at a higher location while the support structure is in the unfolding state, i.e. the flat monitor being rotated from a vertical state to a horizontal folding state, because the gravity center of the flat monitor is shifted, the support structure is more likely to fall or even cause damage to the flat monitor, therefore the inconvenience generated while the manufacturer or user processes the folding operation shall be improved.

SUMMARY OF THE INVENTION

One primary objective of the present invention is to provide a support structure, in which a main hinge pivoted at an upper end of a connection unit is installed with a stop member, so when an object to be supported is placed at a higher location while being in an unfolding state, the object to be supported is restrained from being rotated from a vertical state to a horizontal state due to the stop function provided by the stop member; when the support structure is desired to be folded, a non-parallel four-bar linkage mechanism formed through an auxiliary connection member, a base hinge, the main hinge and the connection unit can drive the stop member to rotate thereby gradually altering the stopping location, and the object to be supported is enabled to be horizontally folded; as such, the object to be supported can be maintain in a stable state during the folding process, thereby preventing the occurrence of falling.

For achieving said objective, one technical solution provided by the present invention is to provide a support structure, which comprises:

a connection unit, having an upper and a lower ends;

a base;

at least a base hinge, each base hinges utilizes a fixed shaft rod to pass through the lower end of the connection unit and is fastened on a lower rack connected with the base, so the inclined angle of the connection unit is able to be adjusted relative to the base, wherein the fixed shaft rod is additionally installed with at least a lower shaft ring;

at least a main hinge, each main hinge utilizes a moveable shaft rod to pass through the upper end of the connection unit, an upper rack connected with an object to be supported and a stop member, wherein the stop member is served to stop the upper rack, and the moveable shaft rod is additionally installed with at least an upper shaft ring capable of being linked therewith; and at least an auxiliary connection member, installed in parallel at at least one side of the connection unit, an upper and a lower ends of each auxiliary connection member are respectively pivoted in an upper connection hole formed at the periphery of the upper shaft ring and a lower connection hole formed at the periphery of the lower shaft ring, and the distance defined from the lower connection hole to the center point of the fixed shaft rod is greater than the distance defined from the upper connection hole to the center point of the moveable shaft rod;

through folding the connection unit towards the base, the upper end of the auxiliary connection member reversely links the upper shaft ring to rotate, and further drives the moveable shaft rod and the stop member to rotate, thereby gradually altering the stopping location, and the upper rack is enabled to gradually and reversely rotate to a horizontal folding state relative to the connection unit.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
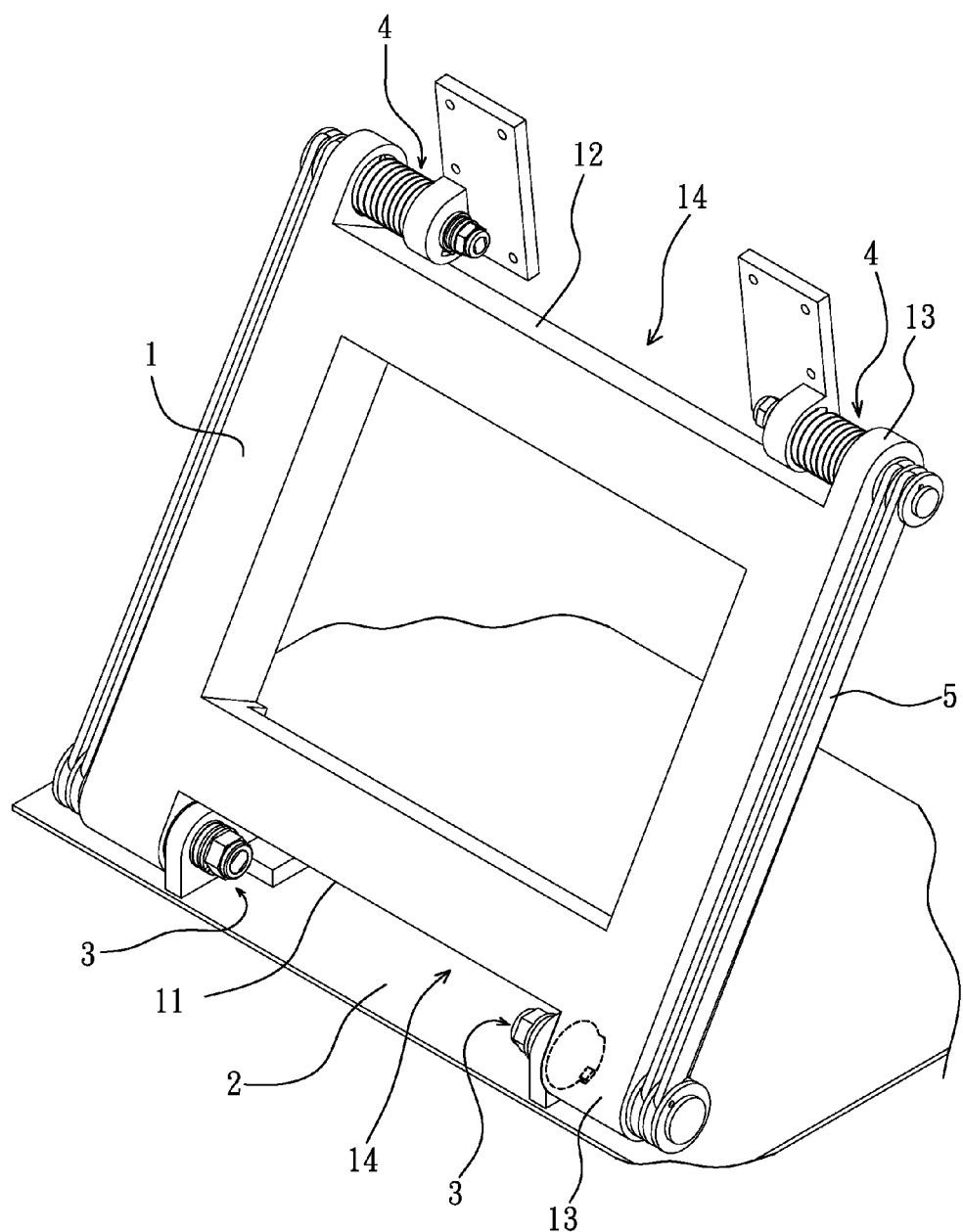
FIG. 1 is a perspective view illustrating the support structure according to the present invention.
Figure 2:
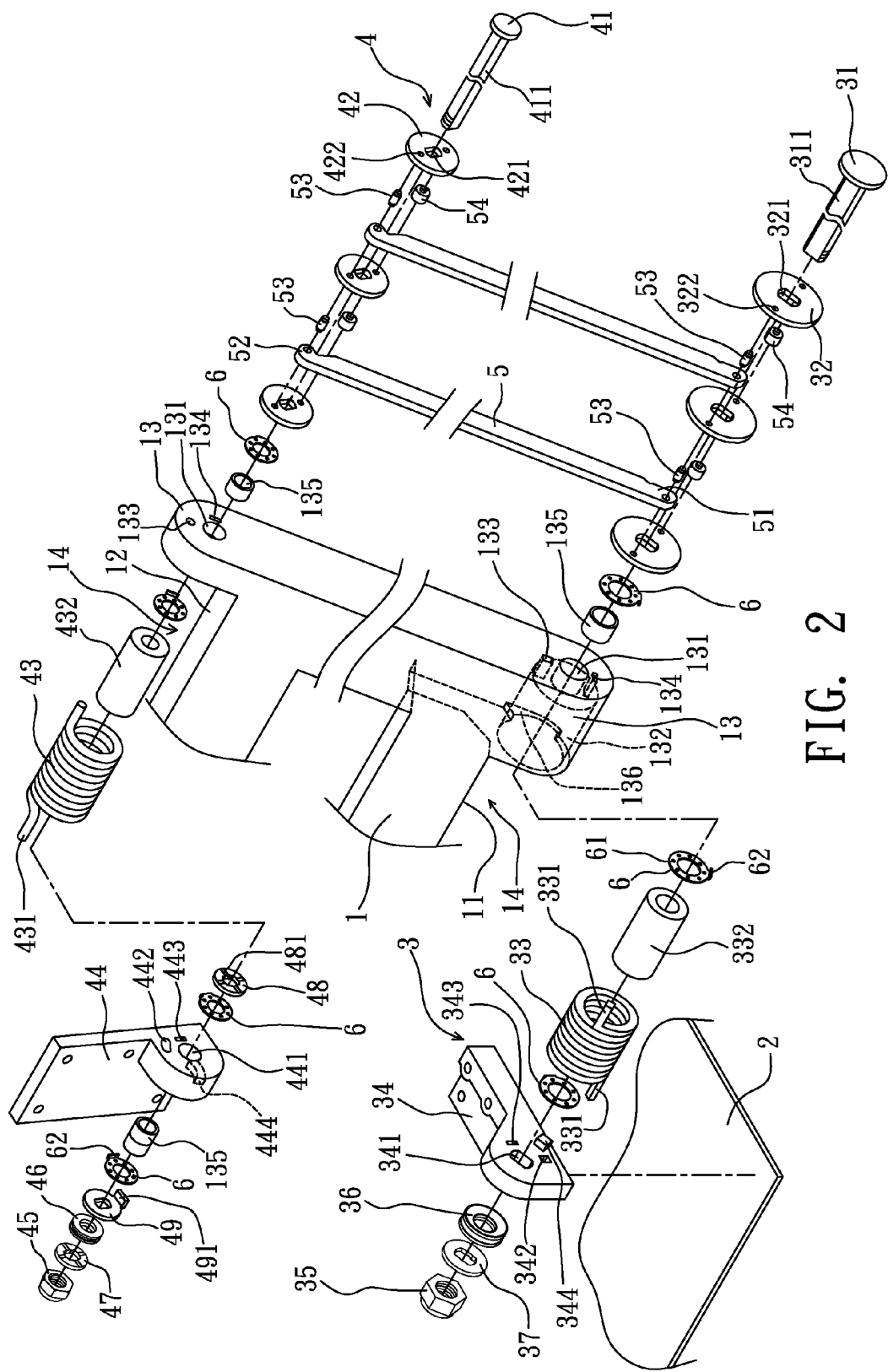
FIG. 2 is a perspective exploded view illustrating the support structure according to the present invention.
Figure 3:
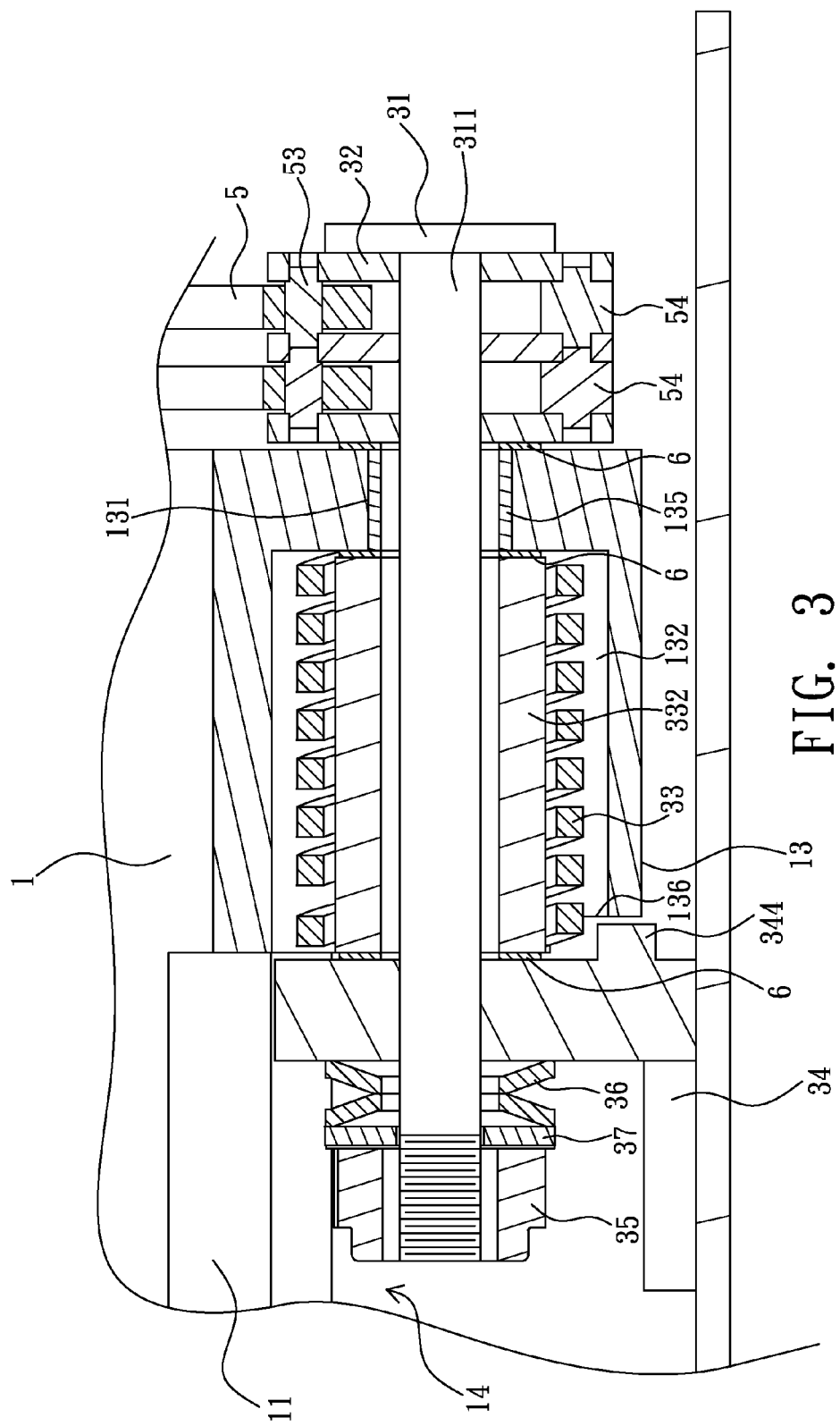
FIG. 3 is a cross sectional view illustrating the assembly of the connection unit, the base and the base hinge according to the present invention.
Figure 4:
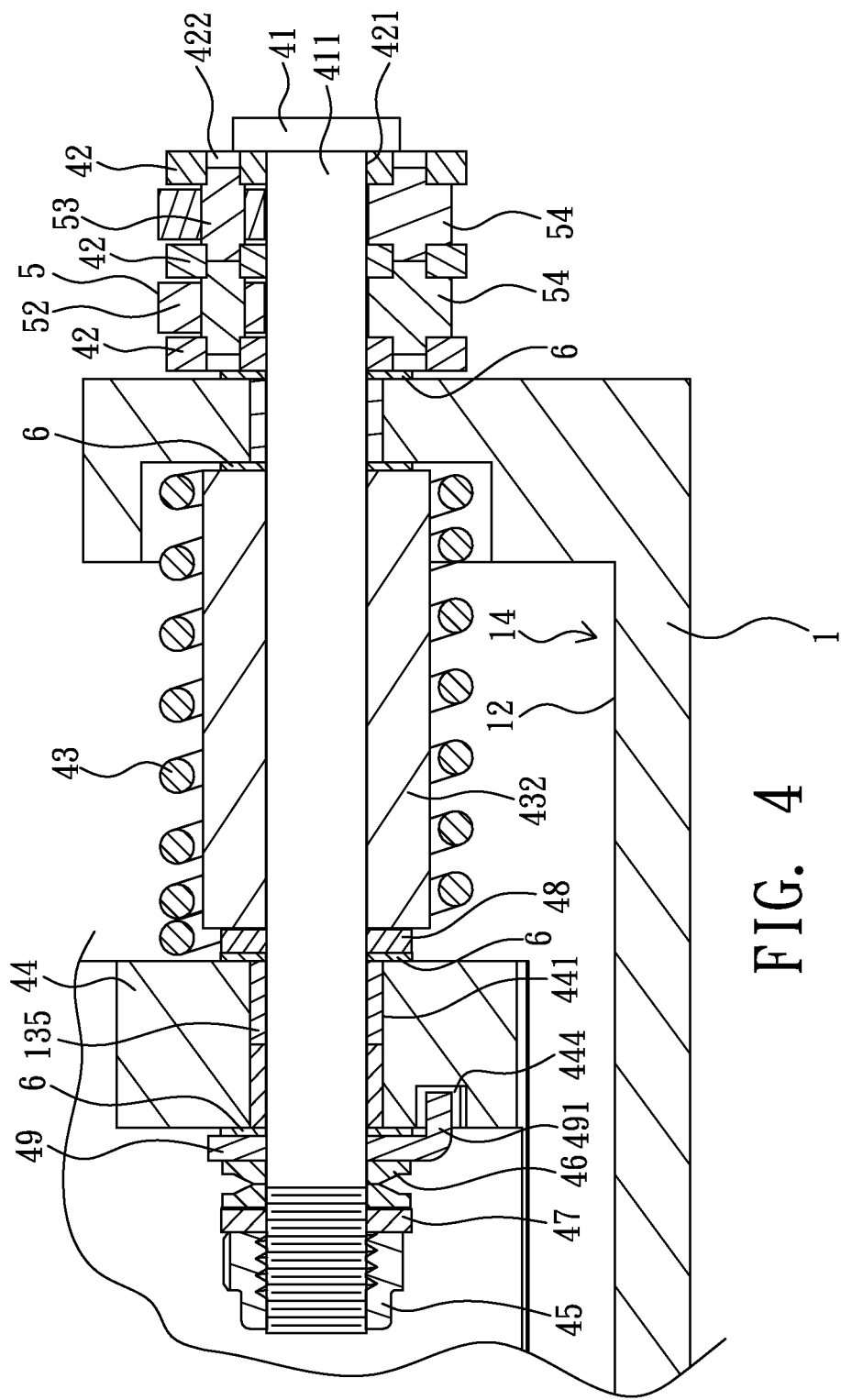
FIG. 4 is a cross sectional view illustrating the assembly of the connection unit and the main hinge according to the present invention.
Figure 5:
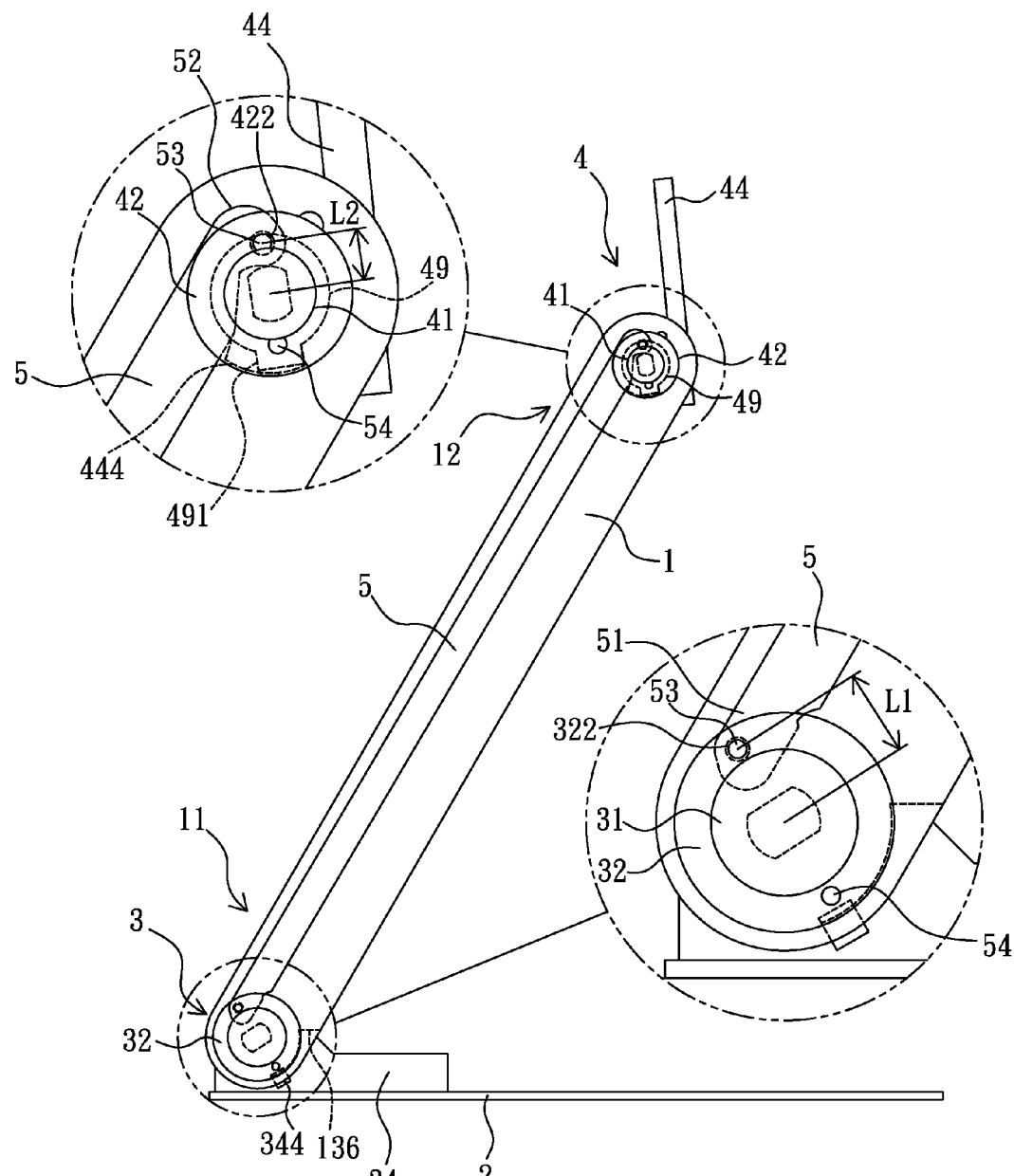
FIG. 5 is a side view illustrating the assembly of the support structure according to the present invention.
Figure 6:
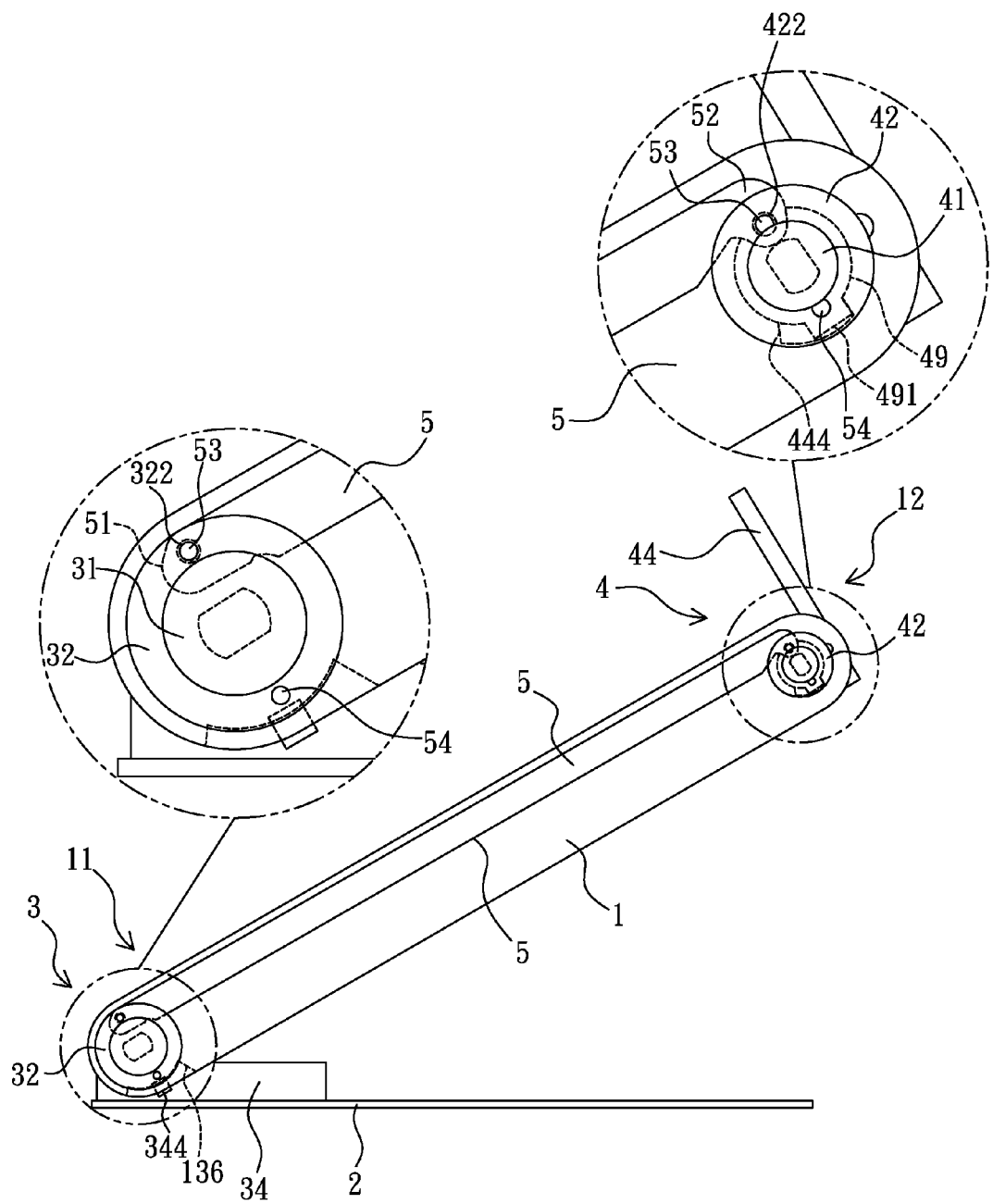
FIG. 6 is a side view illustrating the inclined angle of the support structure being adjusted according to the present invention.
Figure 7:
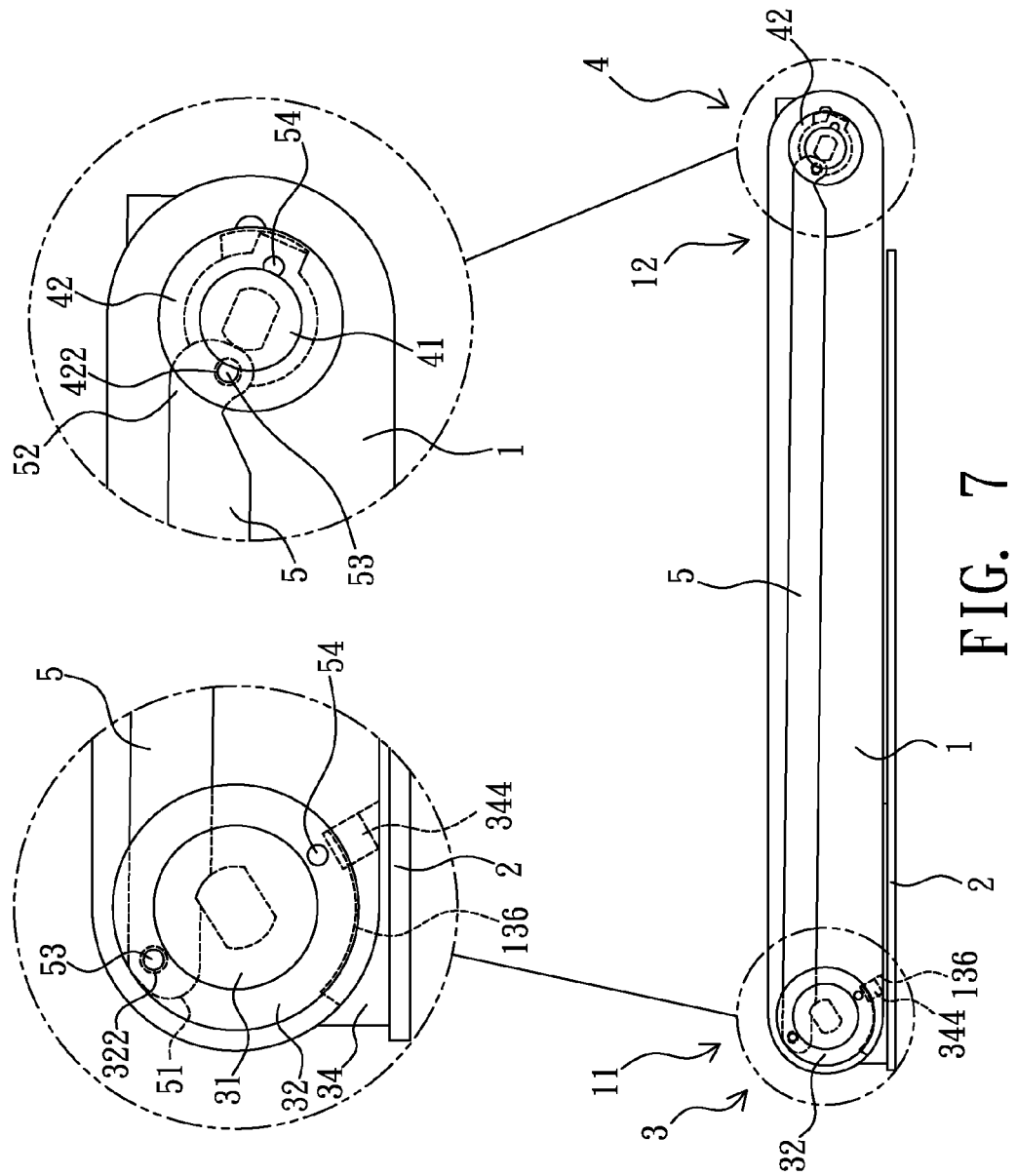
FIG. 7 is a side view illustrating the support structure being adjusted to a folding state according to the present invention.

The accompanying drawings are included to provide a further understanding of the invention, and are incorporated in and constitute a part of this specification. The drawings illustrate embodiments of the invention and, together with the description, serve to explain the principles of the invention, wherein FIG. 1 is a perspective view illustrating the support structure according to the present invention; FIG. 2 is a perspective exploded view illustrating the support structure according to the present invention; FIG. 3 is a cross sectional view illustrating the assembly of the connection unit, the base and the base hinge according to the present invention; FIG. 4 is a cross sectional view illustrating the assembly of the connection unit and the main hinge according to the present invention; FIG. 5 is a side view illustrating the assembly of the support structure according to the present invention; FIG. 6 is a side view illustrating the inclined angle of the support structure being adjusted according to the present invention; and FIG. 7 is a side view illustrating the support structure being adjusted to a folding state according to the present invention.

As shown in FIG. 1 and FIG. 2, the support structure provided by the present invention substantially comprises a connection unit 1, a base 2, at least a base hinge 3, at least a main hinge 4, and at least an auxiliary connection member 5.

The connection unit 1 is a plate member having its bottom and top respectively formed with a lower end 11 and an upper end 12, wherein the lower and the upper ends 11, 12 are respectively pivoted with the base 2 and an object to be supported, e.g. a flat monitor, through the base hinge 3 and the main hinge 4 thereby forming a rotary state. As shown in FIG. 1, two lateral sides of the upper and the lower ends 12, 11 are respectively extended with a pair of lugs 13, and a concave part 14 is defined between each pair of lugs 13.

The base 2 can be disposed on a planar body, e.g. a table surface. The base 2 is pivoted with the connection unit 1 through the base hinge 3, thereby enabling the inclined angle of the connection unit 1 to be adjusted relative to the base 2.

The base hinge 3 is rotationally and oppositely installed between the lower end 11 of the connection unit 1 and the base 2. As shown in FIG. 1, two base hinges 3 are respectively pivoted with the lower lugs 13 at the left and right sides of the connection unit 1. For providing a clear and full disclosure of the technical characteristic of the base hinge 3, only the base hinge 3 at the right side of the connection unit 1 is shown in FIG. 2.

Each base hinge 3 utilizes a fixed shaft rod 31 to sequentially pass through at least a lower shaft ring 32, a shaft hole 131 of the lower lug 13, sleeve with a torsion spring 33 disposed in an accommodation chamber 132 axially formed in the shaft hole 131, then pass through a lower rack 34 formed on the base 2, then the end part of the fixed shaft rod 31 is connected with an end seal member 35, e.g. an anti-loosening nut, in the concave part 14 located at the inner side of the lower rack 34. In addition, at least an elastic member 36, e.g. a spring or disk-shaped elastic sheets staggeringly arranged, which allows the fixed shaft rod 31 to pass through can be additionally installed between the lower rack 34 and the end seal member 35, and a washer 37 is installed between the elastic member 36 and the end seal member 35, thereby elastically tightening adjacent components and enabling the connection unit 1 to rotate or be stopped and positioned relative to the two lower racks 34.

Two end parts 331 of the torsion spring 33 are respectively fastened in a rack slot 342 formed at the periphery of a rack hole 341 of the lower rack 34 and a lug slot 133 of the accommodating chamber 132 communicating with the outer wall of the lug 13, as such, when the connection unit 1 is rotated between the two lower racks 34 through the fixed shaft rod 31, the torsion spring 33 is enabled to store energy or release energy. The weight of the object to be supported, e.g. a flat monitor, can offset the elastic force of at least a torsion spring 33, thus a user can apply less force to easily rotate the connection unit 1 relative to the two lower racks 34. In addition, in order to avoid an interfere effect formed between the fixed shaft rod 31 and the torsion spring 33 in an energy storing state, a sleeve 332 is installed in the torsion spring 33 allowing the fixed shaft rod 31 to pass through.

Referring to FIG. 2, the fixed shaft rod 31 is a columnar body having a noncircular cross section, the surface thereof is formed with at least a plane 311 for passing a ring hole 321 formed in the lower shaft ring 32 and having the same cross section as the fixed shaft rod 31, and the fixed shaft rod 31 is respectively fastened on the lower racks 34 having rack holes 341 with the same cross section as the fixed shaft rod 31. As such, when the inclined angle of the connection unit 1 is adjusted between the two lower racks 34, the lower shaft ring 32 and the fixed shaft rod 31 are prevented from being driven to rotate.

Moreover, in order to increase the wear resistant effect between contacting surfaces of adjacent components, such as the lower shaft ring 32 and the lower lug 13, the sleeve 332 and the lower lug 13, and the sleeve 332 and the lower rack 34, the inner and the outer walls of the circular shaft hole 131 of the lug 13 and the outer wall of the rack hole 341 of the lower rack 34 are respectively installed with a wear resistant ring 6 having plural oil holes 61 at the periphery, wherein the periphery of each wear resistant ring 6 is protrudingly formed with a tenon 62 so as to be inserted in a tenon slot 134, 343 preset at the periphery of the shaft hole 131 and the rack hole 341, thereby fastening each wear resistant ring 6 between said adjacent components. In addition, a shaft tube 135 is sleeved in the shaft hole 131 of the lower lug 13 for preventing the wearing of the shaft hole 131.

Moreover, adjacent surfaces defined between the inner opening of the accommodation chamber 132 of the lower lug 13 and the lower rack 34 are oppositely installed with a positioning slot 136 and a positioning tenon 344, wherein the positioning tenon 344 is received in the positioning slot 136 for defining the inclined angle of the connection unit 1 relative to the two lower racks 34, i.e. the base 2; as such, when being in a folding state, the included angle between the connection unit 1 and the base 2 is zero degree thereby forming a parallel stacking state.

The main hinge 4 is rotationally and oppositely installed between the upper end 12 of the connection unit 1 and the object to be supported, e.g. a flat monitor. As shown in FIG. 1, two main hinges 4 are respectively pivoted with the upper lugs 13 at the left and right sides of the connection unit 1; for providing a clear and full disclosure of the technical characteristic of the main hinge 4, only the main hinge 4 at the right side of the connection unit 1 is shown in FIG. 2.

Each main hinge 4 utilizes one end of a moveable shaft rod 41 to sequentially pass through at least an upper shaft ring 42, a shaft hole 131 of the upper lug 13, sleeve with a torsion spring 43 and a friction ring 48 in the concave part 14 at the inner side of the upper lug 13, then pass through a circular rack hole 441 of an upper rack 44 which is connected to the object to be supported, then sleeve with a stop member 49 at the inner side of the upper rack 44, then the end part of the moveable shaft rod 41 is connected with an end seal member 45, e.g. an anti-loosening nut. As what has been disclosed for the illustration of base hinge 3, at least an elastic member 46, e.g. a spring or disk-shaped elastic sheets staggeringly arranged, which allows the moveable shaft rod 41 to pass through can be additionally installed between the upper rack 44 and end seal member 45, and a washer 47 can be installed between the elastic member 46 and the end seal member 45, thereby elastically tightening adjacent components and enabling the upper rack 44 to rotate or be stopped and positioned relative to the connection unit 1.

Two end parts 431 of the torsion spring 43 are respectively fastened in a rack slot 442 formed at the periphery of a rack hole 441 of the upper rack 44 and a lug slot 133 formed at the periphery of the shaft hole 131 of the upper lug 13, as such, when the two upper racks 44 are rotated at the upper end 12 of the connection unit 1 through the moveable shaft rod 41, the torsion spring 43 is enabled to store energy or release energy. In addition, in order to avoid an interfere effect formed between the moveable shaft rod 41 and the torsion spring 43 in an energy storing state, a sleeve 432 is installed in the torsion spring 43 allowing the moveable shaft rod 41 to pass through.

The moveable shaft rod 41 is a columnar body having a noncircular cross section, the surface thereof is formed with at least a plane 411 for passing a ring hole 421 formed in the upper shaft ring 42 and having the same cross section as the moveable shaft rod 41, and the moveable shaft rod 41 passes through a circular rack hole 441 formed on the upper rack 44. As such, when the two upper racks 44 perform the operation of elevation angle adjustment at the upper end 12 of the connection unit 1, the upper shaft ring 42 and the moveable shaft rod 41 are prevented from being driven to rotate.

As what has been disclosed, in order to increase the wear resistant effect between contacting surfaces of adjacent components, such as the upper shaft ring 42 and the upper lug 13, the sleeve 432 and the upper lug 13, the friction ring 48 and the upper rack 44 and the upper rack 44 and the stop member 49, the inner and the outer walls of the circular shaft hole 131 of the upper lug 13 and the outer wall of the rack hole 441 of the upper rack 44 are respectively installed with a wear resistant ring 6 having plural oil holes 61 at the periphery, wherein the periphery of each wear resistant ring 6 is protrudingly formed with a tenon 62 so as to be inserted in a tenon slot 134, 443 preset at the periphery of the shaft hole 131 and the rack hole 441, thereby fastening each wear resistant ring 6 between said adjacent components. In addition, at least a shaft tube 135 is sleeved in the shaft hole 131 of the upper lug 13 and the rack hole 441 of the upper rack 44 for preventing the wearing of the shaft hole 131 and the rack hole 441.

The stop member 49 is linked to move with the moveable shaft rod 41 and is protrudingly formed with an abutment tenon 491 extending towards the adjacent surface of the upper rack 44, the abutment tenon 491 is inserted in an adjustment slot 444 correspondingly formed on the upper rack 44, thereby defining the elevation angle adjustment of the upper rack 44. As such, the stop member 49 is served to stop the upper rack 44 thereby restraining the object to be supported from being rotated from a vertical state to a horizontal folding state while the object to be supported being at a higher location of the support structure. What shall be addressed is that the arrangement of the abutment tenon and the adjustment slot is not limited to said manner disclosed in this embodiment, i.e. the abutment tenon can be protrudingly formed on the inner surface of the upper rack 44, and the adjustment slot can be concavely formed at the outer surface of the stop member 49, and the same effects of elevation angle adjustment and stop can be achieved. Moreover, the surface of the friction ring 48 is formed with an oil slot 481 and linked to move with the moveable shaft rod 41.

The auxiliary connection member 5 is a rod member connected to at least one side of the connection unit 1, as shown in FIG. 1, two sides of the connection unit 1 are respectively connected with two sets of auxiliary connection members 5, an upper and a lower ends 52, 51 of each auxiliary connection member 5 are respectively pivoted with a shaft pin 53 so as to be connected with an upper and a lower connection hole 422, 322 formed at the peripheries of the upper and the lower shaft rings 42, 32 of the main hinge 4 and the base hinge 3. As shown in FIG. 2 and FIG. 5, the distance L1 defined from the lower connection hole 322 to the center point of the fixed shaft rod 31 is greater than the distance L2 defined from the upper connection hole 422 to the center point of the moveable shaft rod 41, i.e. the distance from the lower end 51 of the auxiliary connection member 5 to the center point of the fixed shaft rod 31 is greater than the distance from the upper end 52 of the auxiliary connection member 5 to the center point of the moveable shaft rod 41, and the differentiation of the two distances enables the auxiliary connection member 5 to link the upper shaft ring 42 to reversely rotate with the lower connection hole 322 of the lower shaft ring 32 serving as the pivot, while the inclined angle of the auxiliary connection member 5 being adjusted with the connection unit 1.

Referring to FIG. 2, at least one side of the connection unit 1 is preferably in parallel installed with two auxiliary connection members 5, wherein upper ends and lower ends 52, 51 of the two auxiliary connection members 5 arranged in parallel are respectively enclosed by three upper and the lower shaft rings 42, 32 which are arranged at intervals, wherein the peripheries of the upper and the lower shaft rings 42, 32 are formed with a pair of upper and lower connection holes 422, 322; wherein one upper and one lower connection holes 422, 322 of each upper and lower shaft rings 42, 32 are pivoted with the shaft pins 53 formed at the upper and the lower ends 52, 51 of each auxiliary connection member 5, thereby forming a better synchronous linkage relation; and the other upper and lower connection holes 422, 322 of each upper and lower shaft rings 42, 32 allow a relay insertion pin 54 to be pivoted.

Substantially, a first side is defined through the auxiliary connection member 5 being pivoted in the upper and the lower connection holes 422, 322 formed at the peripheries of each pair of upper and lower shaft rings 42, 32; and a second side is defined from the upper connection hole 422 to the center point of the moveable shaft rod 41; a third side is defined from the lower connection hole 322 to the center point of the fixed shaft rod 31, wherein the length of the third side is greater than that of the second side, and an imaginary fourth side is defined between the two center points of the moveable and the fixed shaft rods 41, 31; because the upper and the lower ends 12, 11 of the connection unit 1 restrain the locations of the moveable and the fixed shaft rods 41, 31, the lateral side of the connection unit 1 can also be defined as the fourth side, thereby substantially forming a non-parallel four-bar linkage mechanism through the auxiliary connection member 5, the base hinge 3, the main hinge 4 and the connection unit 1.

As what has been disclosed above, each component and the connection relation are clearly and fully illustrated with the accompanying drawings, wherein FIG. 1 is a perspective view showing the support structure according to the present invention; FIG. 2 is a perspective exploded view showing the support structure according to the present invention; FIG. 3 is a cross sectional view illustrating the assembly of the connection unit, the base and the base hinge according to the present invention; and FIG. 4 is a cross sectional view illustrating the assembly of the connection unit and the main hinge according to the present invention.

Referring to FIG. 5, which is a side view showing the assembly of the support structure according to the present invention; the lower rack 34 is fastened on the base 2, and the fixed shaft rod 31 of the base hinge 3 passes through the lower shaft ring 32 and the lower end 11 of the connection unit 1 and is fastened on the lower rack 34 thereby forming a fixed state. The lower end 11 of the connection unit 1 utilizes the fixed shaft rod 31 as a pivot and forms an inclined angle with the base 2. The moveable shaft rod 41 of the main hinge 4 passes through the upper shaft ring 42, the upper end 12 of the connection unit 1, the upper rack 44, the friction ring 48 and the stop member 49, and the abutment tenon 491 of the stop member 49 is received in the adjustment slot 444 of the upper rack 44, the upper rack 44 is further connected with the object to be supported, e.g. a flat monitor, such that the upper rack 44 utilizes the moveable shaft rod 41 as the shaft core, and two ends of the adjustment slot 444 are defined as the limiting range for adjusting the elevation angle. The upper and the lower ends 52, 51 of the auxiliary connection member 5 are respectively pivoted in the upper and the lower connection holes 422, 322 of the upper and the lower shaft rings 42, 32, and the auxiliary connection member 5 utilizes the lower connection hole 322 as the pivot, wherein the distance L1 defined from the lower connection hole 322 to the center point of the fixed shaft rod 31 is greater than the distance L2 defined from the upper connection hole 422 to the center point of the moveable shaft rod 41. As such, as shown in FIG. 5, when the object to be supported is placed at a higher location of the support structure, if being rotated in the counterclockwise direction, the end part of the adjustment slot 444 would stop the abutment tenon 491 of the stop member 49 thereby restraining from being rotated from the vertical state to the horizontal folding state, so the support structure is prevented from being unstable or falling due to the gravity center of the object to be supported being shifted.

As shown in FIG. 6, if the object to be supported is desired to be folded, the lower end 11 of the connection unit 1 utilizes the fixed shaft rod 31 as the pivot to rotate in the clockwise direction; at this moment, the auxiliary connection member 5 synchronously moves with the connection unit 1, and utilizes the lower connection hole 322 as the pivot to rotate in the clockwise direction; because the distance L1 defined from the lower connection hole 322 to the center point of the fixed shaft rod 31 is greater than the distance L2 defined from the upper connection hole 422 to the center point of the moveable shaft rod 41, the upper end 52 of the auxiliary connection member 5 links the upper shaft ring 42 to rotate in the counterclockwise direction, and the upper shaft ring 42 further drives the moveable shaft rod 41 and the friction ring 48 and the stop member 49 sleeved thereon to rotate, and through the friction force applied to the upper rack 44 by the stop member 49 and the friction ring 48, or through the abutment tenon 491 abutting the end part of the adjustment slot 444, the object to be supported which is connected with the upper rack 44 can be synchronously rotated in the counterclockwise direction, thereby gradually altering the inclined angle and the location of gravity center.

Because the stop member 49 rotates in the counterclockwise direction with the moveable shaft rod 41, the abutment tenon 491 also moves in the adjustment slot 444 of the upper rack 44 in the counterclockwise direction, thereby gradually altering the stopping location to allow the object to be supported to be folded to a horizontal state relative to the connection unit 1.

As shown in FIG. 7, when the connection unit 1 is in a parallel folding state relative to the base 2, the upper rack 44 is adjacent to the surface of the connection unit 1, thereby greatly shortening the height of the support structure and facilitating package and transportation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A support structure for an object to be supported, comprising:
    a connection unit, having an upper end and a lower end;
    a base;
    at least one base hinge, each base hinges utilizing a fixed shaft rod to pass through said lower end of said connection unit and being fastened on a lower rack connected with said base, an inclined angle of said connection unit being able to be adjusted relative to said base, wherein said fixed shaft rod being additionally installed with at least a lower shaft ring;
    at least one main hinge, each main hinge utilizing a moveable shaft rod to pass through said upper end of said connection unit, an upper rack connected with said object to be supported and a stop member, wherein said stop member being served to stop said upper rack, and said moveable shaft rod being additionally installed with at least an upper shaft ring capable of being linked therewith; and
    at least one auxiliary connection member, each connection member of the at least one auxiliary connection member being a rod member installed in parallel on at least one side of said connection unit, an upper end and a lower end of each auxiliary connection member being respectively pivotally connected to an upper connection hole formed at the periphery of said upper shaft ring and a lower connection hole formed at the periphery of said lower shaft ring, and a distance defined from said lower connection hole to a center point of said fixed shaft rod being greater than a distance defined from said upper connection hole to a center point of said moveable shaft rod;
    wherein, when folding said connection unit towards said base, said upper end of said auxiliary connection member reversely linking said upper shaft ring to rotate, and further driving said moveable shaft rod and said stop member to rotate, thereby gradually altering the stopping location, and said upper rack being enabled to gradually and reversely rotate to a horizontal folding state relative to said connection unit.

2. The support structure as claimed in claim 1, wherein adjacent surfaces of said stop member and said upper rack are oppositely installed with an abutment tenon and an adjustment slot, and said abutment tenon is inserted in said adjustment slot.

3. The support structure as claimed in claim 1, wherein said upper end and said lower end of said auxiliary connection member are respectively installed with a shaft pin and are pivotally connected to said upper shaft ring and said lower shaft ring by inserting a corresponding shaft pin into said upper connection hole and said lower connection hole respectively formed in said upper shaft ring and said lower shaft ring of said main hinge and said base hinge.

4. The support structure as claimed in claim 1, wherein at least one side of said connection unit is installed with two auxiliary connection members arranged in parallel, upper and lower ends of said two auxiliary connection members are enclosed by three upper and lower shaft rings arranged on opposing sides of each of said two auxiliary connection members, a pair of upper and lower connection holes are oppositely formed at the peripheries of said upper and said lower shaft rings; wherein one upper and one lower connection holes of each upper and lower shaft rings are pivoted with said shaft pins of said upper and said lower ends of said auxiliary connection members, and the other upper and lower connections holes of each upper and lower shaft rings allow a relay pin to be pivoted therein.

5. The support structure as claimed in claim 1, wherein two lateral sides of said upper end and said lower end of said connection unit are respectively extended with a pair of upper and lower lugs, and each pair of upper and lower lugs respectively form a concave part.

6. The support structure as claimed in claim 5, wherein each pair of upper and lower lugs are axially formed with a circular shaft hole and a circular rack hole is axially formed on each upper rack, said circular shaft hole and said circular rack hole are respectively sleeved with at least a wear resistant shaft tube.

7. The support structure as claimed in claim 1, wherein said fixed shaft rod is sleeved with a torsion spring having its two end parts respectively inserted in said lower end of said connection unit and said lower rack, a sleeve allowing said fixed shaft rod to pass through is installed in said torsion spring, and adjacent surfaces between said lower end of said connection unit and said lower shaft ring, said lower end of said connection unit and said sleeve, said lower rack and said sleeve are respectively installed with a wear resistant ring.

8. The support structure as claimed in claim 7, wherein a periphery of said wear resistant ring is protrudingly formed with a tenon so as to be inserted in a tenon slot preset on said lower end of said connection unit and said lower rack.

9. The support structure as claimed in claim 1, wherein adjacent surfaces of said lower end of said connection unit and said lower rack are oppositely installed with a positioning slot and a positioning tenon, wherein said positioning tenon is received in said positioning slot for defining the inclined angle of said connection unit relative to said lower rack.

10. The support structure as claimed in claim 1, wherein said moveable shaft rod is sleeved with a torsion spring and a friction ring, two end parts of said torsion spring are respectively inserted in said upper end of said connection unit and said upper rack.

11. The support structure as claimed in claim 10, wherein a sleeve allowing said moveable shaft rod to pass through is installed in said torsion spring, and adjacent surfaces between said upper end of said connection unit and said upper shaft ring, said upper end of said connection unit and said sleeve, said upper rack and said friction ring, said upper rack and said stop member are respectively installed with a wear resistant ring.

12. The support structure as claimed in claim 11, wherein a periphery of said wear resistant ring is protrudingly formed with a tenon so as to be inserted in a tenon slot preset on said upper end of said connection unit and said upper rack.

\* \* \* \* \*